United States Patent
Yamamoto et al.

(10) Patent No.: US 6,667,946 B1
(45) Date of Patent: Dec. 23, 2003

(54) OPTICAL INFORMATION RECORDING MEDIUM

(75) Inventors: Hiroki Yamamoto, Hitachi (JP); Takashi Naito, Hitachiota (JP); Takashi Namekawa, Hitachi (JP); Yasuo Imanishi, Hitachi (JP); Motoyasu Terao, Hinode-machi (JP); Toshimichi Shintani, Kodaira (JP); Ken Takahashi, Tokai-mura (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/622,480

(22) PCT Filed: Jun. 28, 1999

(86) PCT No.: PCT/JP99/03449
§ 371 (c)(1),
(2), (4) Date: Aug. 17, 2000

(87) PCT Pub. No.: WO00/00965
PCT Pub. Date: Jan. 6, 2000

(30) Foreign Application Priority Data

Jun. 29, 1998  (JP) .......................................... 10-181894

(51) Int. Cl.[7] ................................................ G11B 7/00
(52) U.S. Cl. ................. 369/275.1; 369/53.2; 369/44.27; 369/288
(58) Field of Search ........................... 369/275.1, 275.2, 369/275.4, 275.5, 288, 53.2, 94, 53.22, 53.23, 44.26, 44.27, 44.37; 430/269, 270.13, 270.11; 428/64.1–64.4

(56) References Cited

U.S. PATENT DOCUMENTS

| | | | | |
|---|---|---|---|---|
| 4,579,807 A | * | 4/1986 | Blonder et al. | 430/269 |
| 5,985,401 A | * | 11/1999 | Yamamoto et al. | 369/288 |
| 6,069,862 A | * | 5/2000 | Fujita et al. | 369/53.2 |
| 6,379,767 B1 | * | 4/2002 | Park et al. | 430/270.13 |

FOREIGN PATENT DOCUMENTS

| | | | | | |
|---|---|---|---|---|---|
| JP | 06162564 A | * | 6/1994 | | G11B/7/24 |
| JP | 06267078 A | * | 9/1994 | | G11B/7/00 |
| JP | 08096412 A | * | 4/1996 | | G11B/7/24 |
| JP | 10340482 A | * | 12/1998 | | G11B/7/24 |

* cited by examiner

*Primary Examiner*—Thang V. Tran
(74) *Attorney, Agent, or Firm*—Antonelli, Terry, Stout & Kraus, LLP (57) ABSTRACT

An optical information recording medium includes an inorganic film which changes an intensity or an intensity distribution of light formed on an upper surface of a board, and a recording film, a protecting film, and a reflecting film formed on an upper portion of the inorganic film. The inorganic film is constructed by N (N is an integer of 2 or more) kinds of phases, the phases of the kinds within a range from at least one or more kinds to (N–1) kinds among the N kinds of phases are continuous phases, and the other phases are discontinuous phases. Information, consequently, may be written in high density.

16 Claims, 10 Drawing Sheets

LIGHT SOURCE

FIG. 1

LIGHT SOURCE

LIGHT SOURCE

OPTICAL INFORMATION RECORDING MEDIUM

TECHNICAL FIELD

The invention relates to an optical information recording medium and, more particularly, to an optical information recording medium which can read out or read/write at a high recording density and has high reliability for the repetitive recording and reproducing operations.

BACKGROUND ART

In an optical information recording medium, a compact disc (CD), a laser disc (LD), or the like has been widespread. In recent years, a DVD having a recording density that is seven or more times as large as that of the CD has been put into practical use. As for the DVD, development is being made as a rewritable recording/reproducing medium besides a read only ROM (DVD-ROM) in which information has directly been written on a board. The realization of the practical use of the DVD is being examined also as an RAM for a computer (DVD-RAM).

In a DVD, a high density recording has been accomplished by using a laser beam having a shorter wavelength of about 650 nm than that of the laser (780 nm) used in a CD or the like. In order to handle information of a large capacity such as computer graphics or the like, however, it is necessary to accomplish a further high recording density that is 1.5 to 2 times as large as the above density. To accomplish it, development of semiconductor lasers of green to blue of further short wavelengths (wavelengths: 520 to 410 nm) is being made.

A super resolution film can be mentioned as another high recording density technique. The super resolution film is a film which is formed on a lower surface of a recording medium and a high recording density can be accomplished by reducing a beam spot of incident light transmitted through the film.

One of mechanisms of a super resolution effect is a satural absorption phenomenon which is a phenomenon realized by using such nonlinear optical characteristics that the super resolution film transmits light having an intensity that is equal to or larger than its satural absorption amount and absorbs light having an intensity below the satural absorption amount. Since a spatial intensity of the laser beam which is used for reading or writing has a Gaussian distribution, when the beam passes through the super resolution film, the light at a bottom portion having a low intensity is absorbed by the super resolution film and the light at a center portion having a high intensity is transmitted. Therefore, a beam diameter after the transmission can be reduced.

At present, as such a super resolution film, an organic film of the phthalocyanine system, materials (compounds) of the chalcogenide system, or the like as shown in JP-A-8-96412 or the like can be mentioned. Besides them, such a trial that, as the same organic material, a thermochromic material disclosed in JP-A-6-162564 or a photochromic material disclosed in JP-A-6-267078 is used as a super resolution film is also known.

However, each of the materials as mentioned above has problems in terms of the reliability, productivity, and the like. In the organic film, since an energy density of the beam is locally very high upon recording or reading, if the recording or reproducing operation is repetitively performed, there is a fear that the film deteriorates gradually. Therefore, it is difficult to guarantee the sufficient number of times of the recording or reproducing operation under a severe use environment as in case of an RAM for a computer or the like. Since chalcogenide is chemically unstable, it is difficult to obtain a long guaranteeing period.

DISCLOSURE OF INVENTION

It is an object of the invention to obtain an optical recording medium having a super resolution film which can guarantee the repetitive recording or reproducing operation for a long period and has high productivity and a high super resolution effect.

To solve the above problem, according to the invention, there is provided an optical information recording medium comprising, at least: a board on which pits having information have been formed; and a film which is formed directly on the board or formed thereon through another layer and changes a reflectance or an intensity distribution of reflection light in dependence on an intensity of incident light (such a film is hereinbelow also referred to as a super resolution film), wherein the film is inorganic materials (compounds) constructed by N (N=2, 3, 4, . . . : integer of 2 or more) kinds of phases, the phases in a range from at least one kind to (N−1) kinds among the N kinds of phases are continuous phases, and the other phases are discontinuous phases.

The discontinuous phases are, for example, phases such as spherical or pillar fine particles and are phases having such a discontinuous structure that they are distributed in one matrix. The continuous phases are phases represented by such a matrix phase and are phases all of which are continuous and exist not being independent. The continuous phases exist so as to disperse the discontinuous phases.

There is also provided an optical information recording medium comprising, at least: a board; a film which is formed directly on the board or formed thereon through another layer and changes a reflectance or an intensity distribution of reflection light in dependence on an intensity of incident light; and a recording film which is formed directly on the film or formed thereon through another layer and on which information is recorded by the light, wherein the film is inorganic materials (compounds) constructed by N (N=2, 3, 4, . . . : integer of 2 or more) kinds of phases, the phases in a range from at least one kind to (N−1) kinds among the N kinds of phases are continuous phases, and the other phases are discontinuous phases. A mean diameter of the discontinuous phases lies within a range from 1 nm or more to 70 nm or less. A width of continuous phases existing between the discontinuous phases lies within a range from 0.3 nm or more to 100 nm or less. Further, the continuous phases are amorphous inorganic compounds and the discontinuous phases are crystal inorganic compounds. The continuous phases are a dielectric substance and the discontinuous phases are any of a metal, a semiconductor, and a dielectric substance.

According to the invention, there is provided an optical information recording medium comprising, at least: a board on which pits having information have been formed; and a film which is formed directly on the board or formed thereon through another layer and changes a reflectance or an intensity distribution of reflection light in dependence on an intensity of incident light, wherein the film is constructed by N (N=2, 3, 4, . . . : integer of 2 or more) kinds of phases containing at least one or more kinds of elements selected from Co, Ti, V, Cr, Mn, Fe, Ni, Si, Pb, Bi, and Al, the phases in a range from at least one kind to (N−1) kinds among the N kinds of phases are continuous phases, and the other phases are discontinuous phases.

Further, there is provided an optical information recording medium comprising, at least: a board; a film which is formed directly on the board or formed thereon through another layer and changes a reflectance or an intensity distribution of reflection light in dependence on an intensity of incident light; and a recording film which is formed directly on the film or formed thereon through another layer and on which information is recorded by the light, wherein the film is constructed by N (N=2, 3, 4, . . . integer of 2 or more) kinds of phases containing at least one or more kinds of elements selected from Co, Ti, V, Cr, Mn, Fe, Ni, Si, Pb, Bi, and Al, the phases in a range from at least one kind to (N−1) kinds among the N kinds of phases are continuous phases, and the other phases are discontinuous phases.

Further, according to the invention, there is provided an optical information recording medium comprising, at least: a board; a film which is formed directly on the board or formed thereon through another layer and changes a reflectance or an intensity distribution of reflection light in dependence on an intensity of incident light; and a recording film which is formed directly on the film or formed thereon through another layer and on which information is recorded by the light, wherein a refractive index of the film changes due to the incident light when the incident light enters, and assuming that a refractive index at the time when no incident light enters is labelled to $n_0$ and an intensity of the incident light is set to I, if the absolute value n of the refractive index that is measured is indicated by $$n=n_0+n_2I$$

a value of $n_2$ lies within a range from $1.0 \times 10^{-9}$ ($m^2$/W) or larger to $1.0 \times 10^{-7}$ ($m^2$/W) or less.

In this instance, the refractive index change (n−$n_0$) occurs in such a manner that the refractive index is saturated within a period of time which lies within a range from $2.50 \times 10^{-7}$ second or longer to $3.50 \times 10^{-7}$ second or shorter after the irradiation of the incident light and is recovered to the original refractive index within a time interval which lies within a range from $2.5 \times 10^{-7}$ second or longer to $1.0 \times 10^{-2}$ second or shorter after the removal of the incident light.

Further, the film is an oxide which contains a Co oxide of 60 to 95 weight % as an oxide of CoO and in which a remaining part is constructed by elements of at least one or more kinds among Si, Ti, Al, Pb, and Bi.

According to the invention, there is provided an optical information recording/reproducing apparatus comprising, at least: lasers of a plurality of wave-lengths; means for selecting one of the lasers; and a mechanism for automatically adjusting a focal point which changes every laser, wherein the apparatus further has means for discriminating a recording capacity of a medium to record or reproduce and means for changing a tracking in accordance with the medium discriminated by the discriminating means.

BEST MODE FOR CARRYING OUT THE INVENTION

Embodiment 1

The invention will be described in detail by using an embodiment.

Figure 1:
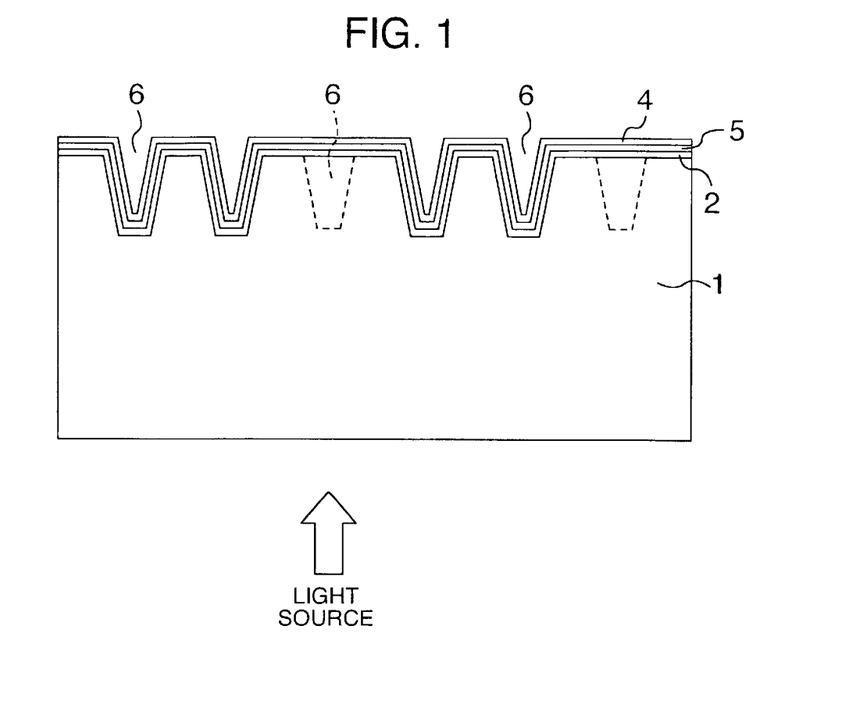
FIG. 1 is a diagram of a cross section of an ROM disk formed in an embodiment of the invention.

FIG. 1 shows a schematic diagram of a partial cross section of an ROM disk formed in the embodiment. In FIG. 1, reference numeral 1 denotes a board; 2 a super resolution film; 5 an $SiO_2$ protecting film; 4 a reflecting film made of a material of the Al—Ti system; and 6 a pit which has been written with information. Although one of polycarbonate, polyolefin, glass, and the like is used as a board 1 in accordance with the specification, polycarbonate is used in the embodiment. In FIG. 1, light for reading (for example, laser beam) enters from the lower position as shown by an arrow.

Further, the ROM disk is formed by the following steps. First, a pit pattern having information is formed on a photoresist by using a laser. After that, the pit pattern is copied to an Ni die and polycarbonate is injection formed into the die, thereby forming a board. The super resolution film 2 having a desired film thickness is formed on the board by sputtering. The $SiO_2$ protecting film 5 having a film thickness of 140 nm is formed and, thereafter, the reflecting film 4 having a film thickness of 100 nm made of a material of the Al—Ti system is formed by sputtering. A thickness of board 1 is equal to 0.6 mm. In the embodiment, two boards (shown in FIG. 1) formed as films are adhered to each other with a UV (ultra-violet rays) curable resin while the reflecting films 4 are set to the back side, so that an ROM disk having a thickness of 1.2 mm is obtained. As a film thickness of super resolution film 2, a thickness within a range from 100 nm or more to 300 nm or less is selected.

In the embodiment, by changing compositions (Nos. 1 to 29 in Table 1, which will be explained hereinlater) of the film corresponding to the super resolution film 2, ROM disks (No. 30 in Table 1, which will be explained hereinlater) are formed and super resolution characteristics of each disk are evaluated. As a comparison example, an ROM disk (No. 30 in Table 1, which will be explained hereinlater) on which the super resolution film 2 is not formed is also formed. A sputtering apparatus which can simultaneously sputter two disks is used for sputtering. The compositions are changed on the films by independently changing their powers.

Figure 14:
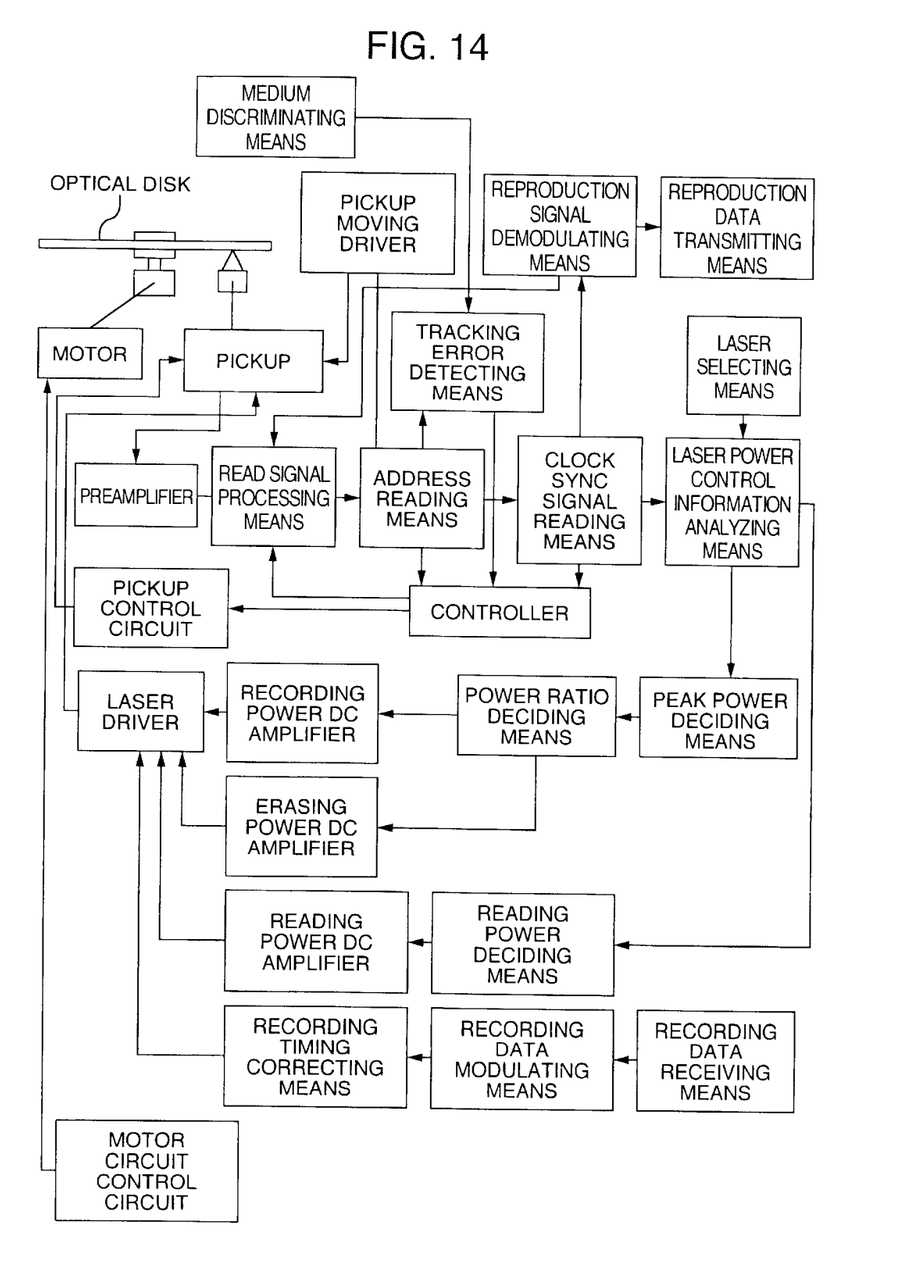
FIG. 14 is a block diagram of an optical information recording/reproducing apparatus formed in the embodiment.

FIG. 14 shows a block diagram of an optical information recording/reproducing apparatus used in the embodiment. The apparatus has a medium discriminating means for discriminating the kind of optical disk serving as an optical memory medium. An optical disk is fixed temporarily to a rotating mechanism connected directly or indirectly to a rotary shaft of a motor which is controlled by motor circuit control means. The information on the optical disk is read as a photosignal by a laser serving as a light source in the pickup and a sensing unit for sensing the reflection light. Information is stored onto the optical disk by the light source in the pickup. The photosignal passes through a preamplifier, read signal processing means, address reading means, and clock sync signal reading means and is outputted through reproduction signal demodulating means to the outside of the apparatus by reproduction data sending means. Reproduction data is outputted by predetermined output means such as display apparatus, speaker, or the like or is subjected to data processes by an information processing apparatus such as a personal computer or the like.

In the embodiment, laser selecting means which can select an arbitrary laser wavelength is provided besides a circuit system which is used for normal recording and reproduction. A peak power which is used is determined by peak power deciding means on the basis of an output of the laser selecting means and on the basis of an analysis of a laser power control information analyzing means. A reading power is similarly determined by reading power deciding means. An output of the peak power deciding means is inputted to a laser driver via a recording power DC amplifier and an erasing power DC amplifier through power ratio deciding means and controls the light source in the pickup. Similarly, an output of the reading power deciding means is inputted to the laser driver through a reading power DC amplifier and controls the light source in the pickup. As an actual laser, a semiconductor laser of 780 nm which is used for a CD and semiconductor lasers of 650 nm, further, 520 nm, and 410 nm which are used for a DVD are installed.

Since a focus and a focal depth differ depending on a wavelength, the laser is designed so as to have such a structure that an auto-focusing can be performed in association with the selection. Further, in correspondence to a structure in which a super resolution film is mounted on the disk and a tracking width is made thin, in tracking error detecting means, another means for high density recording is separately provided, thereby enabling the tracking operation to be performed in accordance with a medium. A kind discriminating mechanism for discriminating the medium by using a difference of reflectance of media is provided, thereby designing the apparatus so that the auto-tracking can be performed in accordance with a difference of the medium kinds. Upon data recording, recording data is inputted from recording data receiving means, is data modulated by recording data modulating means, is inputted to the laser driver through recording timing correcting means, and controls the light source in the pickup.

By using a construction as shown in FIG. 14, not only conventional CD and DVD can be compatibly used but also disks having different recording capacities due to the realization of a large capacity can be handled by one apparatus. The optical information recording/reproducing apparatus can be properly changing its construction in accordance with its object or application field and used.

Table 1 shows reproduction output characteristics of compositions of the films corresponding to the formed super resolution films and a low frequency component (2 MHz) and a high frequency component (10 MHz) under such conditions that a reading power is set to 1, 2, 3, and 4 mW. The presence or absence of the super resolution effect to be discriminated from this table is also shown. The laser beam used for reading is derived from the semiconductor laser of a wavelength of 650 nm.

TABLE 1

| No. | Components (weight ratio) | Output 2 MHz | | | | Output 10 MHz | | | | Nonlinear refractive index ($n_2$ (m$^2$/w)) | Response time (ns) | Super resolution effect |
|---|---|---|---|---|---|---|---|---|---|---|---|---|
| | | 1 mW | 2 mW | 3 mW | 4 mW | 1 mW | 2 mW | 3 mW | 4 mW | | | |
| 1 | CoO | 34 | 35 | 35 | 33 | 1 | 2 | 2 | 1 | $2.5 \times 10^{-15}$ | 140 | X |
| 2 | SiO$_2$ | 38 | 40 | 41 | 40 | 1 | 2 | 2 | 2 | $3.4 \times 10^{-18}$ | 125 | X |
| 3 | SiO$_2$:CoO = 1:1 | 35 | 36 | 36 | 37 | 2 | 3 | 3 | 2 | $6.2 \times 10^{-12}$ | 210 | X |
| 4 | SiO$_2$:CoO = 1:2 | 43 | 44 | 45 | 47 | 10 | 13 | 20 | 25 | $2.7 \times 10^{-8}$ | 330 | ○ |
| 5 | SiO$_2$:CoO = 1:3 | 39 | 40 | 45 | 42 | 17 | 19 | 23 | 28 | $5.4 \times 10^{-8}$ | 345 | ○ |
| 6 | SiO$_2$:CoO = 1:4 | 38 | 35 | 38 | 40 | 20 | 25 | 30 | 35 | $7.4 \times 10^{-8}$ | 350 | ○ |
| 7 | SiO$_2$:CoO = 1:9 | 38 | 38 | 39 | 38 | 22 | 27 | 32 | 38 | $1.0 \times 10^{-7}$ | 350 | ○ |
| 8 | Glass | 36 | 39 | 32 | 37 | 1 | 2 | 2 | 3 | $6.3 \times 10^{-17}$ | 180 | X |
| 9 | Glass:CoO = 1:1 | 37 | 38 | 40 | 41 | 5 | 4 | 8 | 9 | $5.9 \times 10^{-12}$ | 220 | X |
| 10 | Glass:CoO = 1:2 | 35 | 38 | 39 | 38 | 12 | 15 | 21 | 29 | $3.3 \times 10^{-8}$ | 300 | ○ |
| 11 | Glass:CoO = 1:3 | 37 | 38 | 38 | 37 | 17 | 20 | 22 | 28 | $5.9 \times 10^{-8}$ | 320 | ○ |
| 12 | Glass:CoO = 1:4 | 38 | 39 | 41 | 40 | 20 | 25 | 29 | 32 | $1.1 \times 10^{-7}$ | 350 | ○ |
| 13 | TiO$_2$ | 35 | 36 | 36 | 35 | 1 | 2 | 3 | 3 | $1.0 \times 10^{-11}$ | 200 | X |
| 14 | TiO$_2$:CoO = 1:1 | 37 | 36 | 35 | 37 | 2 | 3 | 4 | 6 | $2.9 \times 10^{-10}$ | 195 | X |
| 15 | TiO$_2$:CoO = 1:2 | 35 | 37 | 38 | 40 | 15 | 16 | 18 | 22 | $9.2 \times 10^{-9}$ | 250 | ○ |
| 16 | TiO$_2$:CoO = 1:3 | 36 | 38 | 39 | 40 | 15 | 18 | 19 | 21 | $2.2 \times 10^{-8}$ | 310 | ○ |
| 17 | TiO$_2$:CoO = 1:4 | 37 | 35 | 38 | 39 | 18 | 19 | 22 | 28 | $6.7 \times 10^{-8}$ | 345 | ○ |
| 18 | Al$_2$O$_3$ | 39 | 38 | 37 | 38 | 2 | 3 | 2 | 2 | $2.3 \times 10^{-18}$ | 155 | X |
| 19 | Al$_2$O$_3$:CoO = 1:1 | 39 | 40 | 38 | 39 | 14 | 15 | 18 | 20 | $1.0 \times 10^{-8}$ | 325 | ○ |
| 20 | Al$_2$O$_3$:CoO = 1:2 | 40 | 41 | 41 | 40 | 15 | 17 | 19 | 23 | $2.5 \times 10^{-8}$ | 335 | ○ |

TABLE 1-continued

| | | Output | | | | | | | | Nonlinear refractive index | Response time | Super resolution effect |
| | | 2 MHz | | | | 10 MHz | | | | | | |
| | Components | | | | | | | | | | | |
| No. | (weight ratio) | 1 mW | 2 mW | 3 mW | 4 mW | 1 mW | 2 mW | 3 mW | 4 mW | ($n_2$ (m$^2$/w)) | (ns) | |
|---|---|---|---|---|---|---|---|---|---|---|---|---|
| 21 | $Al_2O_3$:CoO = 1:3 | 35 | 36 | 38 | 38 | 17 | 18 | 20 | 25 | $1.0 \times 10^{-8}$ | 350 | ○ |
| 22 | $SiO_2$—PbO | 35 | 37 | 37 | 38 | 10 | 12 | 13 | 15 | $9.4 \times 10^{-9}$ | 280 | ○ |
| 23 | ($SiO_2$—PbO):CoO = 1:1 | 38 | 38 | 39 | 41 | 17 | 18 | 20 | 25 | $2.2 \times 10^{-8}$ | 350 | ○ |
| 24 | ($SiO_2$—PbO):CoO = 1:2 | 39 | 38 | 37 | 38 | 22 | 25 | 28 | 30 | $6.5 \times 10^{-8}$ | 360 | ○ |
| 25 | ($SiO_2$—PbO):CoO = 1:4 | 40 | 41 | 41 | 40 | 25 | 26 | 30 | 34 | $3.0 \times 10^{-8}$ | 345 | ○ |
| 26 | $SiO_2$—$Bi_2O_3$ | 36 | 35 | 37 | 36 | 12 | 13 | 15 | 16 | $8.8 \times 10^{-9}$ | 310 | ○ |
| 27 | ($SiO_2$—$Bi_2O_3$):CoO = 1:1 | 37 | 37 | 38 | 37 | 18 | 19 | 22 | 25 | $6.2 \times 10^{-8}$ | 340 | ○ |
| 28 | ($SiO_2$—$Bi_2O_3$):CoO = 1:2 | 38 | 39 | 38 | 38 | 21 | 23 | 24 | 28 | $4.0 \times 10^{-8}$ | 325 | ○ |
| 29 | ($SiO_2$—$Bi_2O_3$):CoO = 1:4 | 37 | 38 | 36 | 37 | 20 | 22 | 23 | 25 | $2.1 \times 10^{-8}$ | 315 | ○ |
| 30 | None | 38 | 41 | 43 | 41 | 1 | 2 | 3 | 5 | $2.7 \times 10^{-20}$ | 120 | X |

In the embodiment, to obtain a higher super resolution effect, a film containing the Co oxide showing large absorption at wavelengths around 650 nm is used as a base and various materials are added, thereby forming films. In Table 1, compositions are shown by a weight ratio of each component. In Table 1, No. 1 shows a single-phase film of CoO and No. 2 shows a single-phase film of $SiO_2$. Nos. 3 to 7 indicate films formed by using two films of $SiO_2$ and CoO as targets and adjusting a sputtering power of each target. Similarly, No. 8 shows a film formed by mixing a soda-lime glass of the $SiO_2$—$Na_2O$—CaO—MgO—$Al_2O_3$ system. Nos. 9 to 12 indicate films formed by mixing the soda-lime glass and CoO. No. 13 indicates a $TiO_2$ single layer film. Nos. 14 to 17 denote mixture films by mixing CoO and $TiO_2$.

Further, Nos. 18 to 21 show mixture films of the $Al_2O_3$ system and CoO. Nos. 22 to 25 show mixture films of the $SiO_2$—PbO glass system and CoO. Nos. 26 to 29 show mixture films of a single layer film of the $SiO_2$—$Bi_2O_3$ glass system and CoO. In those glass systems, glass blocks of the $SiO_2$—PbO system and the $SiO_2$—$Bi_2O_3$ system are previously formed and used as targets, thereby forming the films. No. 30 relates to an example in which the super resolution film 2 is not formed.

Figure 2:
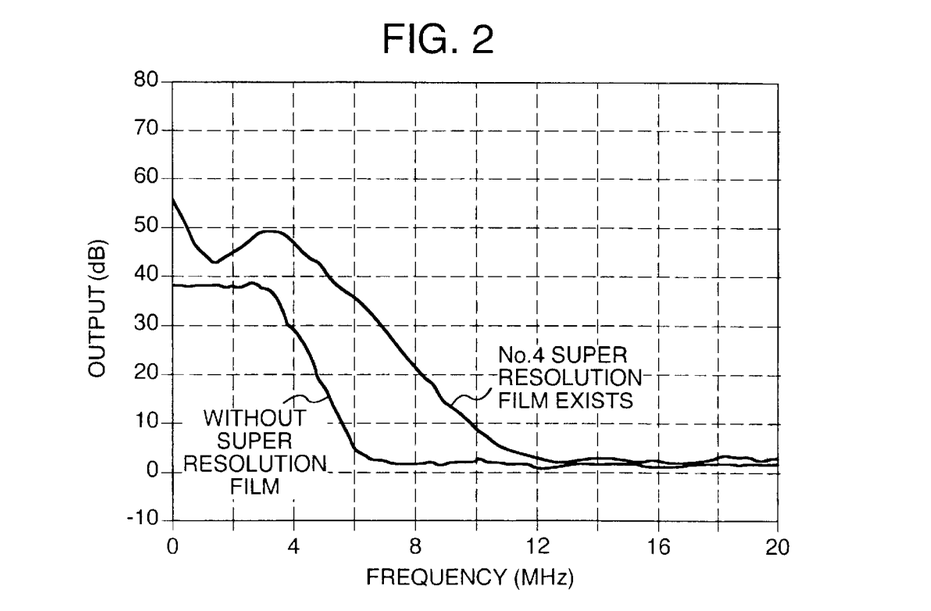
FIG. 2 is a diagram showing a reading frequency dependence of an output derived from the ROM disk in FIG. 1.

In FIG. 2, the frequency dependence of reproduction output characteristics was analyzed by a spectrum analyzer. A measurement example of the reproduction output characteristics by the spectrum analyzer is shown. In FIG. 2, the formed film is the film of No. 4 in the embodiment. A measurement example in the case (No. 30) where no film is formed is also shown as a comparison example. Both reproducing laser powers are equal to 1 mW.

In the case where the film of No. 4 in the embodiment is formed as a super resolution film, it has been found that an output level is high up to a higher frequency component than that in the case where no super resolution film is formed (No. 30). Since the high frequency component of the signal is drawn on the ROM disk by a denser pit pattern, in the case where the super resolution film is formed, this means that a finer pit pattern is read out and a reproduction signal is outputted. Thus, in the case where the super resolution film of No. 4 is formed, the super resolution effect is obtained.

Upon discrimination of the super resolution effect in Table 1, outputs at 2 MHz and 10 MHz in each reproduction output are read out from a spectrum as shown in FIG. 2. The case where the output at 10 MHz as a high frequency signal is equal to or higher than 10 dB is set to "o" by regarding that there is the super resolution effect. The case where it is lower than 10 dB is determined by setting it to "x".

In the case where the super resolution film is not formed like No. 30 in Table 1, as shown in FIG. 2, although a relatively high output is obtained at a low frequency of 2 MHz, a sufficient output is not obtained at a high frequency of 10 MHz and it has been found that data in this frequency region cannot be read out.

In the CoO—$SiO_2$ system of Nos. 1 to 7, reproduction outputs at a high frequency are low and the super resolution effect cannot be obtained in case of the CoO single-phase film of No. 1 and the $SiO_2$ single-phase film of No. 2 and in the case where the ($SiO_2$:CoO) ratio of No. 3 is equal to (1:1). In cases of Nos. 4 to 6 in which the content of CoO exceeds 60%, the high frequency component is also reproduced as a high output and the super resolution effect is obtained.

In the CoO-soda-lime glass system of Nos. 8 to 12, in a manner similar to the cases of Nos. 2 to 6, although the super resolution effect cannot be obtained in case of the glass single-phase film of No. 8 and in case of the (glass:COO) ratio=(1:1) of No. 9, the super resolution effect can be obtained in cases of Nos. 10 to 12 in which the CoO content is large.

Even in the $TiO_2$—CoO system films of Nos. 13 to 17, in a manner similar to the embodiment, although the super resolution effect cannot be obtained in case of the $TiO_2$ single-phase film (No. 13), the super resolution effect can be obtained in Nos. 13 to 17 in which a large amount of CoO is contained. Similarly, in the $Al_2O_3$—CoO system of Nos. 18 to 21, although the super resolution effect is not obtained in the $Al_2O_3$ single-phase film, the super resolution effect can be obtained by allowing a large amount of CoO to be contained in this film.

In the ($SiO_2$—PbO)—CoO system of Nos. 22 to 25 and the ($SiO_2$—$Bi_2O_3$)—CoO system film of Nos. 26 to 29, the super resolution effect can be obtained even in the case where CoO is not contained. It has been found that by allowing CoO to be contained therein, an output at a high frequency is large and the very excellent super resolution effect is obtained.

From the above results, it has been found that the high super resolution effect can be obtained irrespective of the components of the matrix such as $SiO_2$, glass, $TiO_2$, or the like if CoO of the content of about 65% or more is contained. Therefore, a relation between the super resolution effect and the CoO content is examined from the output of the high frequency component of 10 MHz at the time when $SiO_2$ is used as a matrix component and the CoO content is increased.

Figure 12:
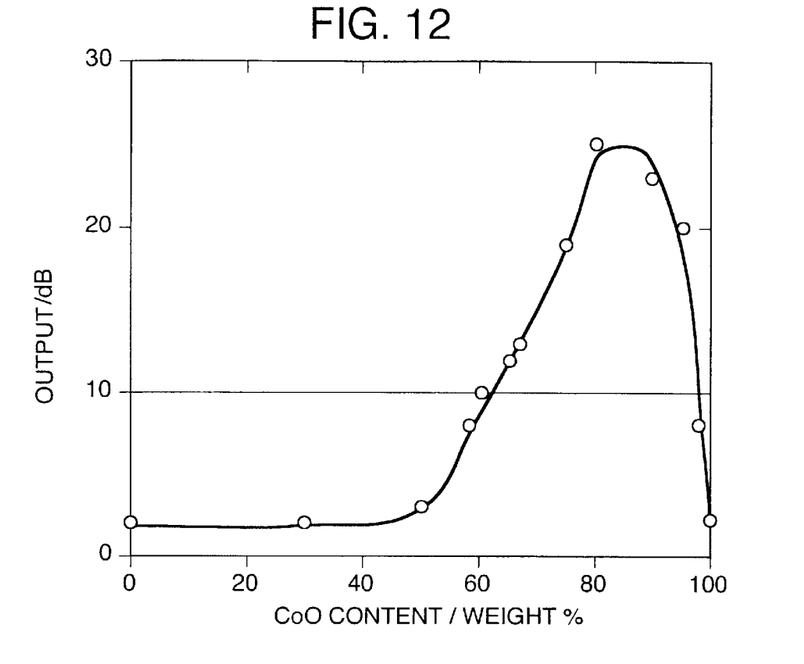
FIG. 12 is a diagram showing a relation between a CoO content and the output.

FIG. 12 shows an output dependence of the ROM disk for the CoO content (weight ratio). The laser wavelength is set to 650 nm and the laser output is set to 2 mW. As shown in FIG. 12, it has been found that in a region of a small CoO content, the output is equal to 1 to 2 dB and is low and the super resolution reproduction is not performed. It has been found that the output gradually increases from a point where the CoO content is equal to about 60 weight % and a relatively high output of about 10 to 20 dB is obtained in a range where the COO content is equal to up to 95 weight %. However, it has been found that if the CoO content exceeds 95 weight %, the output drops suddenly and the super resolution effect is not obtained.

As mentioned above, to obtain the high super resolution effect, it is desirable that the CoO content (when the Co oxide is calculated as an oxide of CoO) lies within a range from 60 weight % or more to 95 weight % or less irrespective of the kind of matrix.

As mentioned above, in the film having the high super resolution characteristics, as shown in Table 1, the reflection light intensity (corresponding to the output), namely, the reflectance is largely changed in dependence on the incident light intensity. As will be explained hereinlater, the reflection intensity of the beam which was reflected by the reflecting film and returned after it had been transmitted through the film does not have a Gaussian distribution upon entering and a deviation occurs in the intensity distribution. From the above results, it has been found that the high super resolution effect is obtained by providing the film in which the reflectance of the reflection light is changed or the intensity distribution is changed in dependence on the intensity of the incident light.

As shown in Table 1, the nonlinear refractive index and the response time of the refractive index change of each film are subsequently evaluated. The evaluation of those optical characteristics is made by using a Z-scan method whereby the film is formed on a glass board, a laser beam of 650 nm is vertically inputted onto the film surface, a sample is scanned in the optical path direction of the incident light, and a peak intensity of the laser is plotted. A nonlinear refractive index $n_2$ is calculated by using the following equation.

$$n=n_0+n_2I$$

where, n denotes the refractive index to be observed, $n_0$ indicates the refractive index which does not depend on the intensity of light, and I shows the intensity of the incident light ($W/l^2$). Therefore, the larger the value of $n_2$ is, the larger the intensity dependence of the refractive index on the light is, and the materials can be regarded as excellent nonlinear optical materials.

The response time is evaluated by a method whereby pulse light on the order of $\mu$ second is irradiated as an excitation light, pulse light on the order of nanosecond is inputted as reading light, the refractive index is measured, and a change in refractive index in the pulse light is plotted for the time. A time that is required from a point when the excitation light enters until a point when the refractive index changes and is saturated is calculated and used as a response time.

By first comparing the refractive index change amount $n_2$, it has been found that $n_2$ of the materials by which the super resolution effect appeared lies within a range of $10^{-9}$ to $10^{-7}$. It has been also found that in case of the materials whose $n_2$ is equal to or less than $9.0 \times 10^{-10}$, no super resolution effect is derived. From the above results, in order to obtain the super resolution effect, it is necessary to set the nonlinear refractive index $n_2$ to be equal to or larger than $1.0 \times 10^{-9}$ ($m^2/W$). If the refractive index change amount is too large, such a phenomenon that the incident light does not reach the recording film appears. When it is examined in detail, if $n_2$ exceeds $1.0 \times 10^{-5}$ ($m^2/W$), the incident light does not reach the recording film and cannot be detected by the photosensing system.

By the above examination, it is preferable that the nonlinear refractive index $n_2$ lies within a range from $1.0 \times 10^{-9}$ ($m^2/W$) or larger to $1.0 \times 10^{-5}$ ($m^2/W$) or less.

The faster the response time of the film is, the larger the refractive index change is obtained even if the medium is rotated at a high speed. It has been found that the larger the nonlinear refractive index $n_2$ is, the longer the response time is. Although the response time changes within a range from 120 nsec to 360 nsec, when the film by which the super resolution effect can be obtained is examined, it has been found that it is sufficient that the response time is equal to or shorter than 350 nsec. If the response time is equal to or shorter than that value, even if the nonlinear refractive index is large, the response time is slow, so that the apparent refractive index change amount decreases. If the response time is too fast contrarily, since the refractive index successively changes during the irradiation of the laser beam, the refractive index is returned to the initial value according to circumstances. There is, consequently, a problem that the refractive index change amount decreases. According to the embodiment, if the response time is equal to or longer than 250 nsec, a decrease in refractive index change amount does not appear. By the above examination, it is desirable that the response time lies within a range from 250 nsec ($2.50 \times 10^{-7}$ second) or longer to 350 nsec ($3.50 \times 10^{-7}$ second) or shorter.

As for an optical information recording medium as a rotating member in which a disk rotates, it has been found that in the case where a portion to be irradiated has been recovered to the original refractive index until the disk is rotated once, the information can be reproduced at a high S/N ratio. By examining the recovery time in detail, good results are obtained in a film which is recovered for a period of time within a range from 250 nsec or longer to 10 msec or shorter. If the recovery time is shorter than 250 nsec, since the foregoing response time is also shortened in such a film, the refractive index change amount substantially decreases. If the recovery time exceeds 10 msec, the refractive index is not recovered until the disk is rotated once and a good super resolution effect is not obtained. From the above results, it is desirable that the recovery time lies within a range from 250 nsec ($2.5 \times 10^{-7}$ second) or longer to 10 msec ($1.0 \times 10^{-2}$ second) or shorter.

Embodiment 2

To subsequently examine a film structure that is effective to obtain the super resolution effect, the film structure of each super resolution film is analyzed by an X-ray diffraction, a transmission electron microscope, and an energy dispersive X-ray spectroscopy. In the embodiment, the film structure of No. 4 by which the super resolution effect was obtained and the film structure of Nos. 1 and 2 by which no super resolution effect was derived are analyzed.

Figure 3:
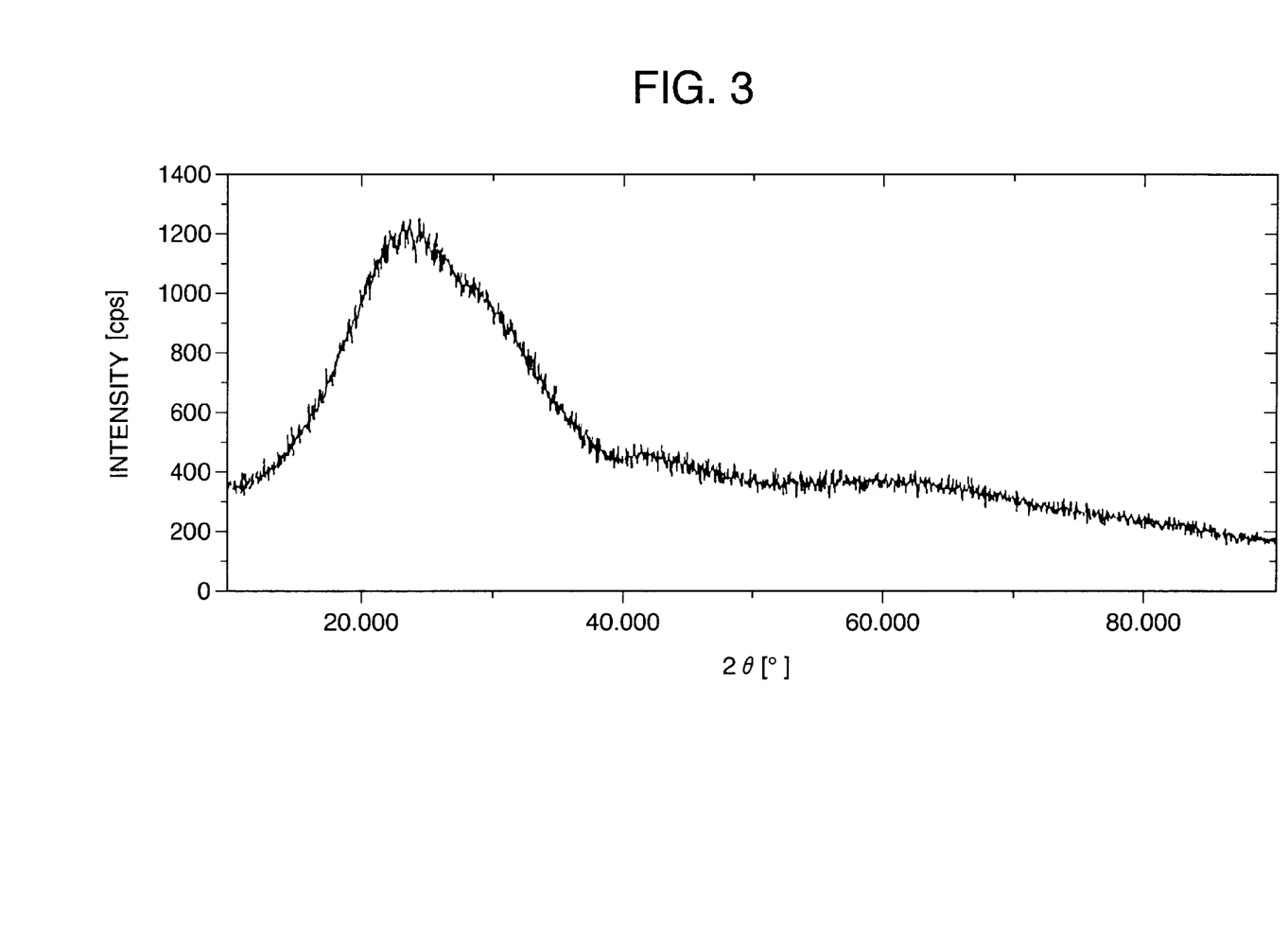
FIG. 3 is a diagram showing an X-ray diffraction pattern of a super resolution film formed in the embodiment of the invention.

FIG. 3 shows an X-ray diffraction pattern of the film of No. 2 as a comparison example. From this diagram, it has been found that a clear diffraction peak does not appear in the film of No. 2 and this film is amorphous.

Figure 4:
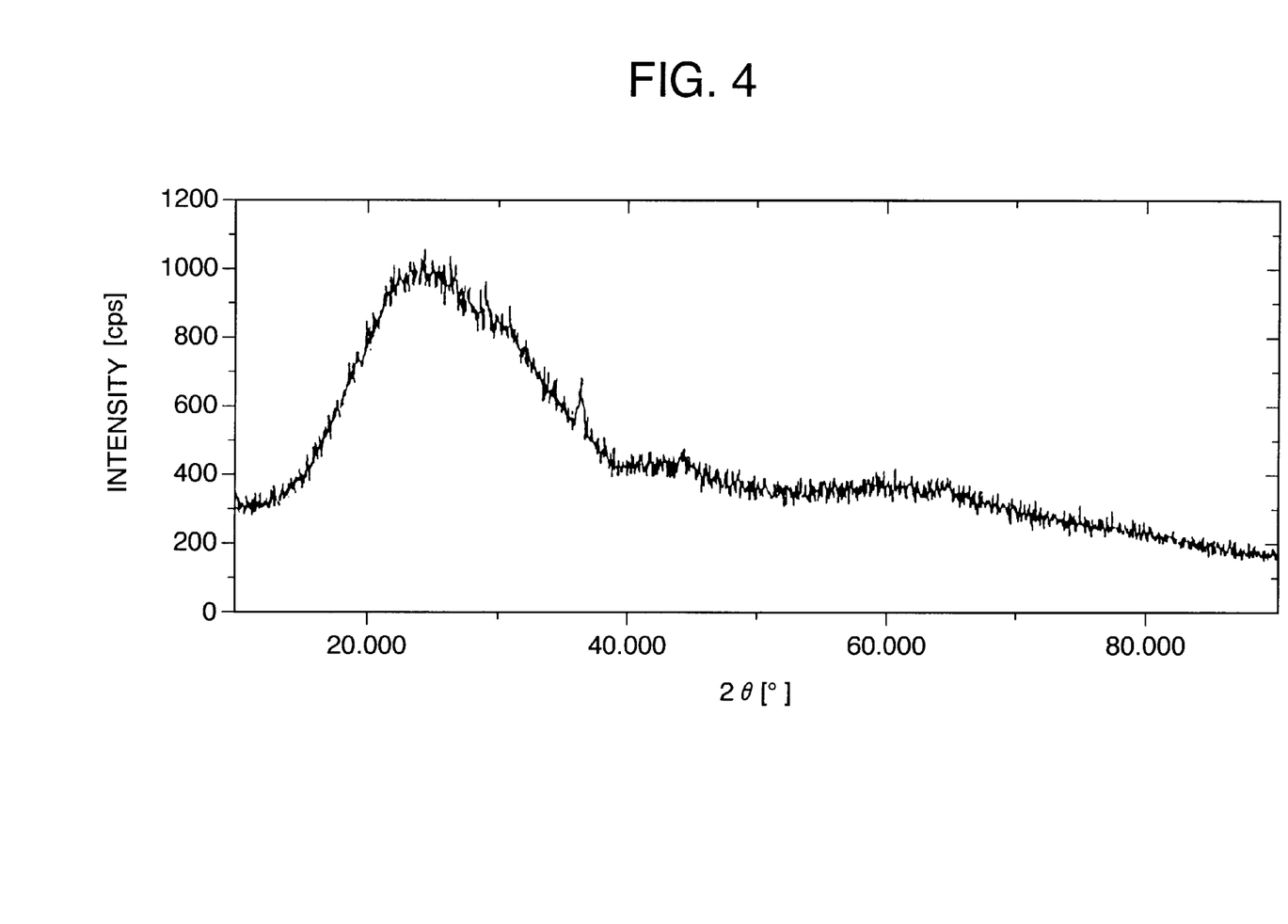
FIG. 4 is a diagram showing an X-ray diffraction pattern of a super resolution film formed in the embodiment of the invention.

FIG. 4 shows an X-ray diffraction peak of the film of No. 4. As shown in FIG. 4, a peak indicative of the existence of a crystal appears while a halopattern which is obtained from the board is used as a background. From the obtained peak, it is possible to decide that the precipitated crystal is CoO. To examine a fine structure of this film in detail, the film structure is evaluated by the transmission electron microscope.

Figure 6:
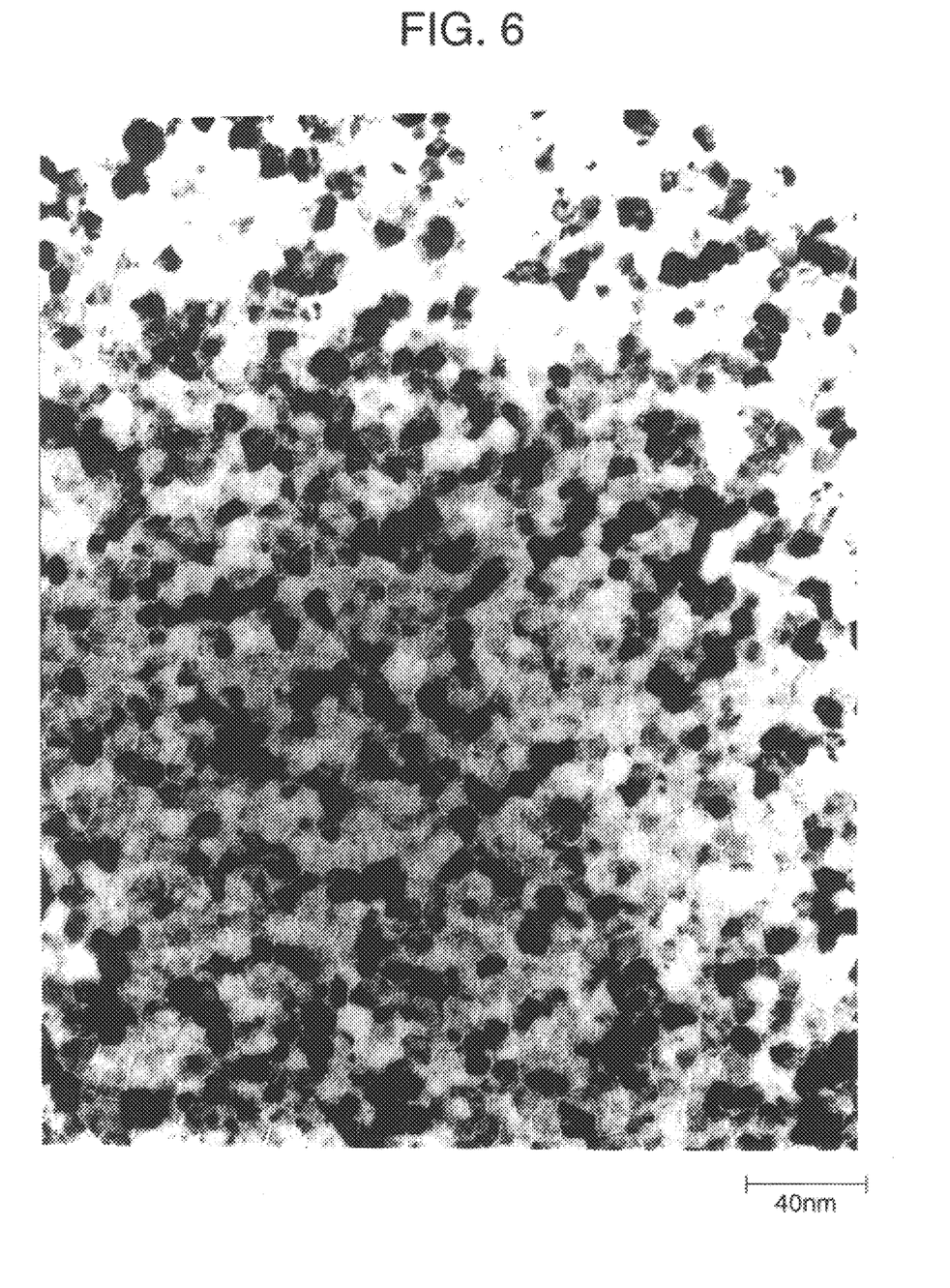
FIG. 6 is a photograph showing a TEM image of a super resolution film formed in the embodiment of the invention.

FIG. 6 is a photograph showing a plane TEM image of the film of No. 4. As shown in the photograph of FIG. 6, it has been found that the film of No. 4 is a set of fine particles having a particle diameter of about 10 nm. It has also been found that a grain boundary phase having a width of about 1 nm exists in the grain boundary portion. It has been found that the grain boundary phase is grown in a state to surround the particles and the grain boundary phase itself forms mesh-like continuous phases. It has been found that the crystal particles are mutually and spatially separated by the continuous phases and become the discontinuous phases. It has, therefore, been found that the film of No. 4 is inorganic materials (compounds) constructed by two kinds of phases, one of the two kinds of phases is the continuous phases, and the other phases are the discontinuous phases.

A similar examination is made for the film of No. 23 in Table 1. It has been found that the film of No. 23 is inorganic compounds constructed by three kinds of phases, one kind among the three kinds of phases is the continuous phases containing Si, and the other two kinds of phases are the two kinds of discontinuous phases containing Co and Pb.

Figure 7:
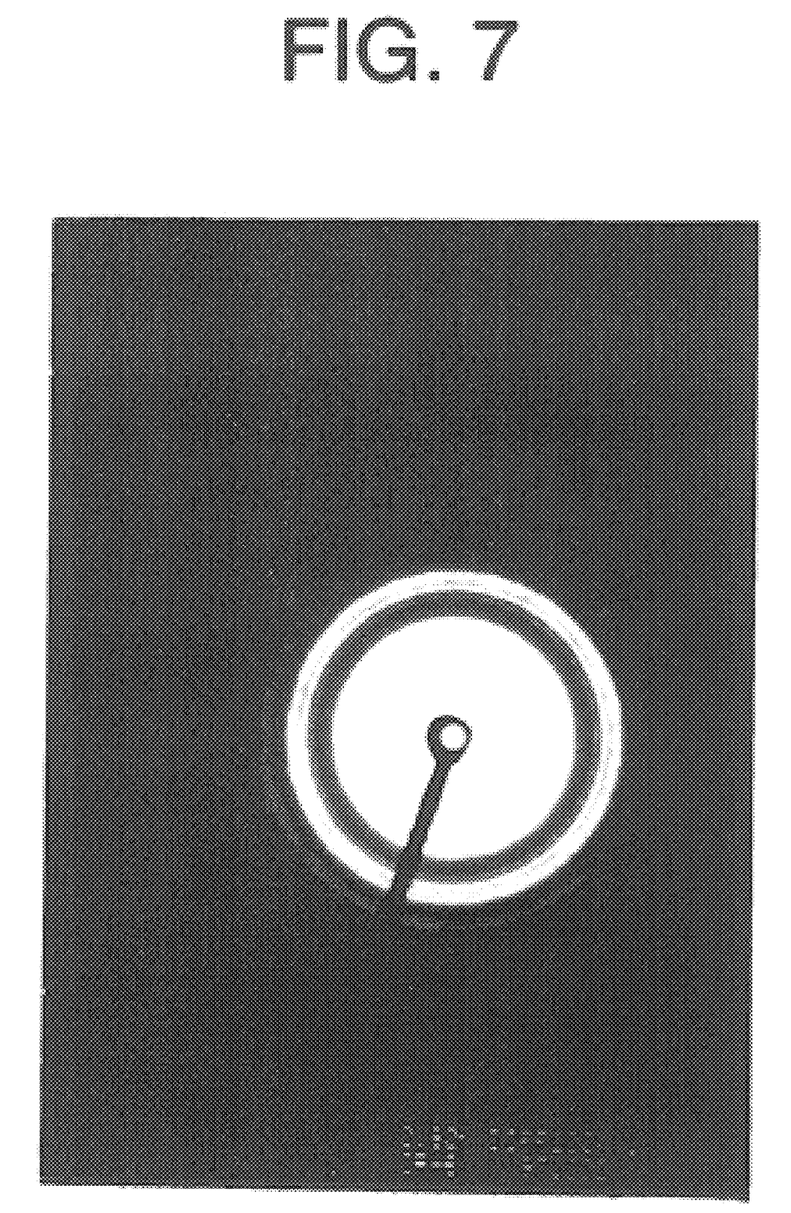
FIG. 7 is a photograph showing an electron beam diffraction image of a super resolution film formed in the embodiment of the invention.

Subsequently, FIG. 7 is a photograph showing a selected area electron diffraction pattern of the film of No. 4. Many spots are observed at several portions of a d value in the photograph. From these results, it has been found that the particles are crystal gain. A slightly bright halo is observed inside of a ring constructed by those spots. Since amorphous constructing this halopattern is not observed in the particles, it is possible to decide that the grain boundary phase is amorphous.

From the above results, it has been found that the film of No. 4 is a set of fine crystal gain having a mean particle diameter of about 10 nm surrounded by the amorphous grain boundary phases.

Figure 5:
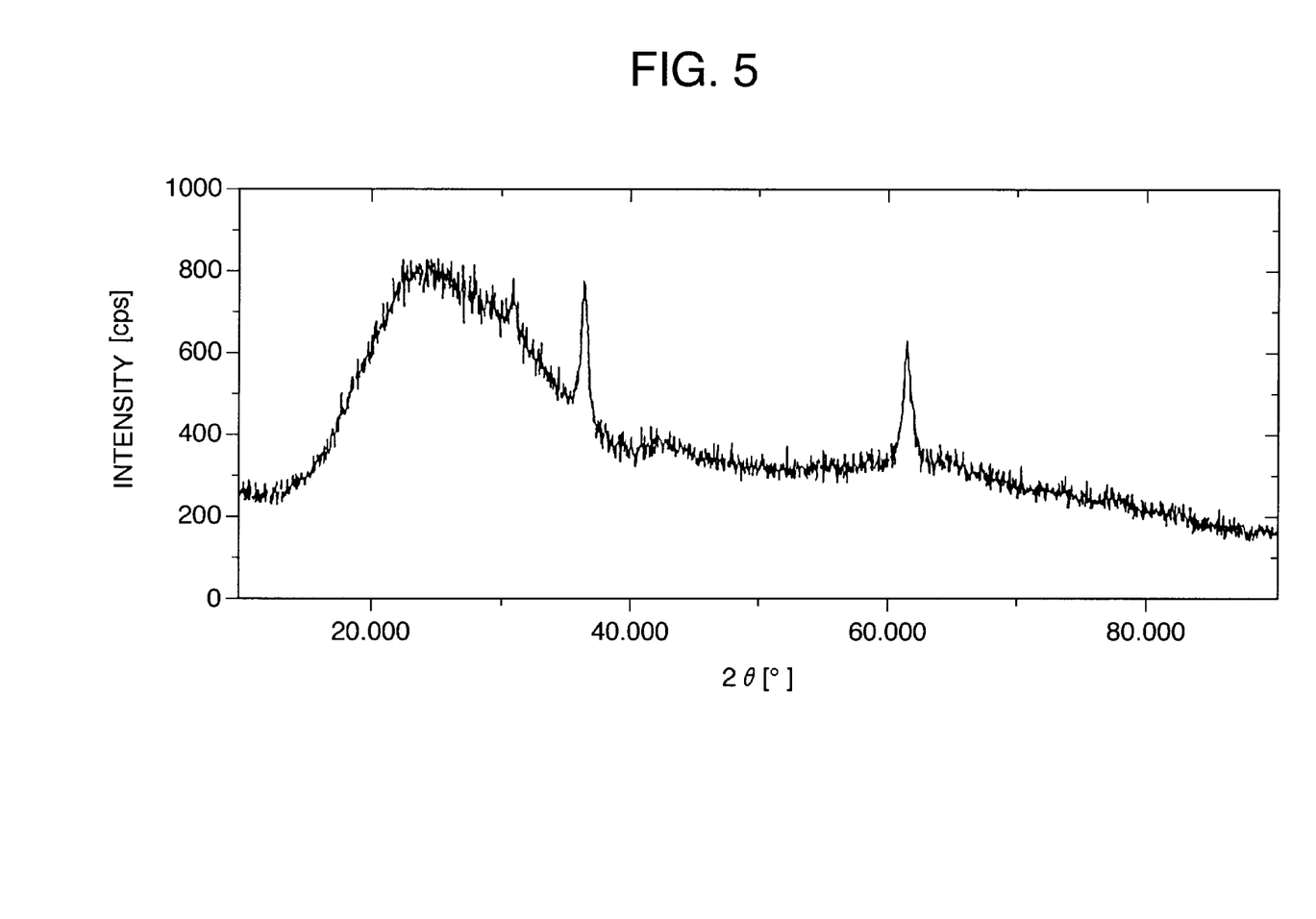
FIG. 5 is a diagram showing an X-ray diffraction pattern of a super resolution film formed in the embodiment of the invention.

FIG. 5 shows an X-ray diffraction pattern of the film of No. 1. As shown in the diagram, a very clear crystalline peak is observed. This peak corresponds to CoO and $Co_3O_4$. When a fine structure of this film is evaluated by the TEM, a particle diameter is equal to about 0.1 $\mu$m. The existence of the amorphous phase as shown in the photograph of FIG. 6 is not observed in the grain boundary portion. From the above results, it has been found that the halopattern seen in the X-ray diffraction pattern of FIG. 5 is caused due to the glass board and the film of No. 1 is constructed only by a crystal.

From the results of the fine structure analysis and the results of the recording and reproducing characteristics shown in Table 1 mentioned above, it has been found that the necessary super resolution effect cannot be derived if the film is the continuous phases such as perfect amorphous or the continuous phases as a perfect crystal. It has been found that a high super resolution effect can be obtained if the film has such a structure that the crystal particles (discontinuous phases) having a particle diameter on the order of nanometer are surrounded by the amorphous continuous phases like a film of No. 4.

An influence which is exerted on the super resolution effect by the existence state of the fine particles is subsequently examined. In the examination, the film of No. 4 is formed as a super resolution film by using a glass board as a board.

The particle diameter of the particles which are formed can be controlled by controlling a board temperature upon film formation. Films having various particle diameters are formed by using the above principle and the super resolution effect is examined. The examination of the super resolution effect is made by evaluating the output of the high frequency component shown in FIG. 2.

Figure 13:
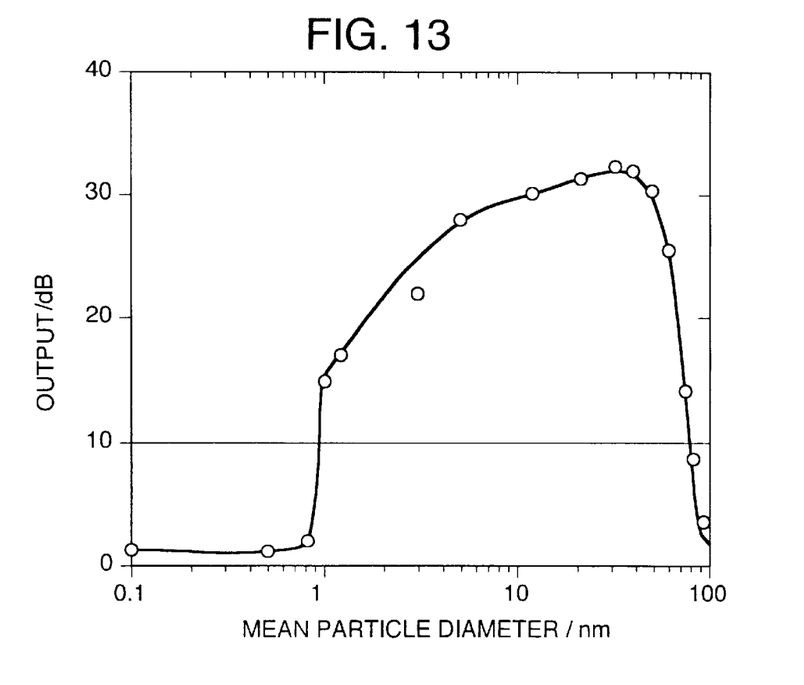
FIG. 13 is a diagram showing a relation between a mean particle diameter of particles precipitated on the film and an output.

FIG. 13 shows a change in output for a mean particle diameter (nm) of the fine particles observed in the film of No. 4. As shown in the diagram, in the case where the mean particle diameter of the fine particles is equal to 0.8 nm, the high frequency output is not sufficiently obtained and an output level is the same as that in case of the amorphous. When the mean particle diameter of the fine particles is equal to 1.2 nm, the output is equal to 15 dB and is improved largely. When the mean particle diameter of the fine particles lies within a range from 5 nm or larger to 50 nm or less, the output is equal to about 28 dB and a relatively large value is obtained.

It has been found that, when the mean particle diameter of the fine particles is further increased, the output decreases from a point where it is equal to about 60 nm and, when the mean particle diameter is equal to 70 to 90 nm, the output is reduced to a small level on the order of one digit. It is considered that this is because as the mean particle diameter of the fine particles increases, the effect of dispersion of the light increases and a light amount to be detected decreases.

From the above results, to obtain the super resolution effect, it is desirable that the mean particle diameter of the precipitated particles lies within a range from 1 nm or more to 70 nm or less. To obtain the higher super resolution effect, it is desirable that the particle diameter of the fine particles lies within a range from 5 nm or more to 50 nm or less.

If the discontinuous phases surrounding the particles do not exist either, no super resolution effect is derived. Even if the film is constructed only by the perfect amorphous phases, no super resolution effect is derived. By the above examination, the relation between the thickness of continuous phases existing between the particles and the super resolution effect is checked, so that the high super resolution effect is not obtained if the width of continuous phase between the particles is less than 0.3 nm. It has been found that, when the continuous phase width lies within a range from 0.3 nm or larger to 100 nm or less, the super resolution effect can be obtained. Thus, it has been found that, when the continuous phase width increases and the particle diameter of the fine particles relatively decreases, it is contrarily difficult to obtain the super resolution effect.

From the above results, although the continuous phases have to exist, it is desirable that the continuous phase width lies within a range from 0.3 nm or more to 100 nm or less.

If the continuous phases are an insulating substance (dielectric substance) of inorganic materials having a wide band gap, excellent translucent performance is obtained and a sufficient reflection intensity is obtained. Further, when the continuous phases are amorphous inorganic compounds, further better translucent performance is obtained. If the continuous phases are a dielectric substance, the fine particles as discontinuous phases do not disperse the light even if they are a semiconductor or metal so long as the particle diameter is sufficiently smaller than a wavelength of laser to be used, specifically speaking, so long as it is equal to or shorter than $\frac{1}{10}$ of a wavelength to be used for measurement. The light is influenced by a dipole of electrons which are excited in the fine particles by the light energy and the super resolution effect can be obtained.

Even in the case where the formed fine particles are inorganic compounds of an insulating substance as mentioned in the embodiment, if an exciting state is formed because electrons in the compounds are excited by the light and the refractive index or the like of the film is changed, the super resolution effect can be obtained.

The above embodiment has been mentioned with respect to the case where the laser wavelength is set to 650 nm and with respect to the system containing Co. However, it has been found that, according to this Co oxide, good super resolution characteristics can be obtained in almost the whole band of the visible light. It has been found that a similar effect can be obtained also in the case where V, Cr, Mn, Fe, or Ni as another transition metal element is allowed to be contained.

Embodiment 3

Figure 8:
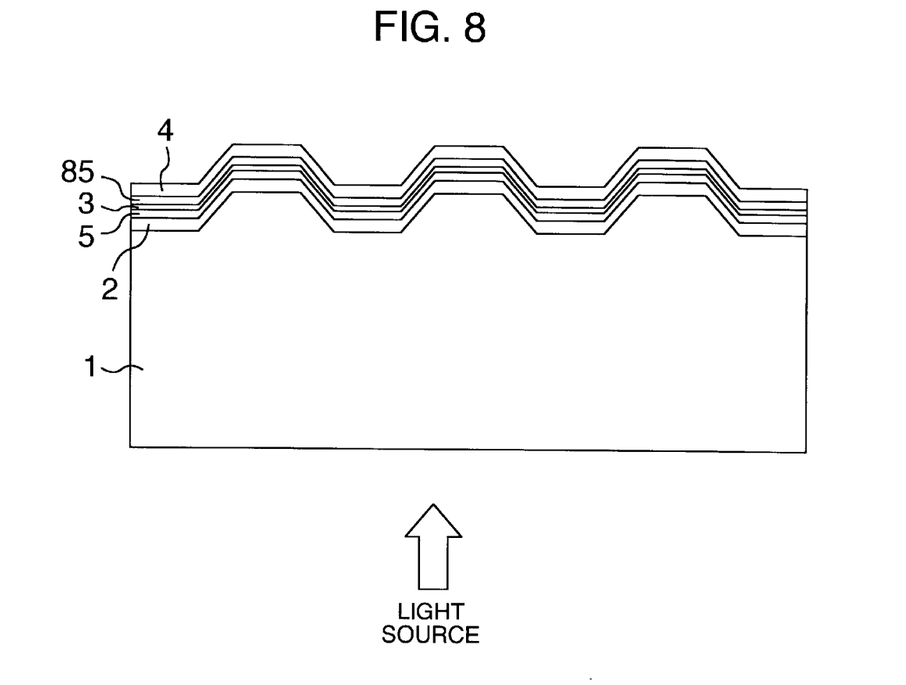
FIG. 8 is a diagram of a cross section of an RAM disk formed in the embodiment of the invention.

An RAM disk constructed by forming the film examined as mentioned above onto the board is subsequently formed and its characteristics are evaluated. FIG. 8 is a diagram showing a partial cross section of the RAM disk formed in the embodiment. In FIG. 8, reference numeral 1 denotes the board, 2 the super resolution film, 3 the recording film, 4 the reflecting film, and 5 and 85 protecting films. An arrow in the diagram indicates an entering direction of light (for example, laser beam) for recording or reproduction. In the embodiment, a disk-shaped board having a thickness of 0.6 mm and a diameter of 120 mm is used as a polycarbonate board of the board 1. The super resolution film 2 having a thickness of 300 nm is formed on the board 1 by a sputtering method. A ZnS—SiO$_2$ protecting film having a thickness of 80 nm is formed on the film 2. After that, a Ge—Sb—Te system phase change film serving as a recording film having a thickness of about 20 nm is likewise formed by the sputtering method. After the formation of the protecting film of about 90 nm, an AlTi reflecting film having a thickness of about 200 nm is further formed. In a manner similar to the case of the ROM disk, two boards on each of which the films shown in FIG. 8 have been formed are adhered to each other with a UV curable resin in a state where the reflecting films 4 are set to the back side, thereby obtaining a desired RAM disk.

In the embodiment, the film having the same compositions as those in the film of No. 4 in Table 1 is used as a super resolution film. An RAM disk on which no super resolution film is formed is also formed as a comparison example.

Figure 9:
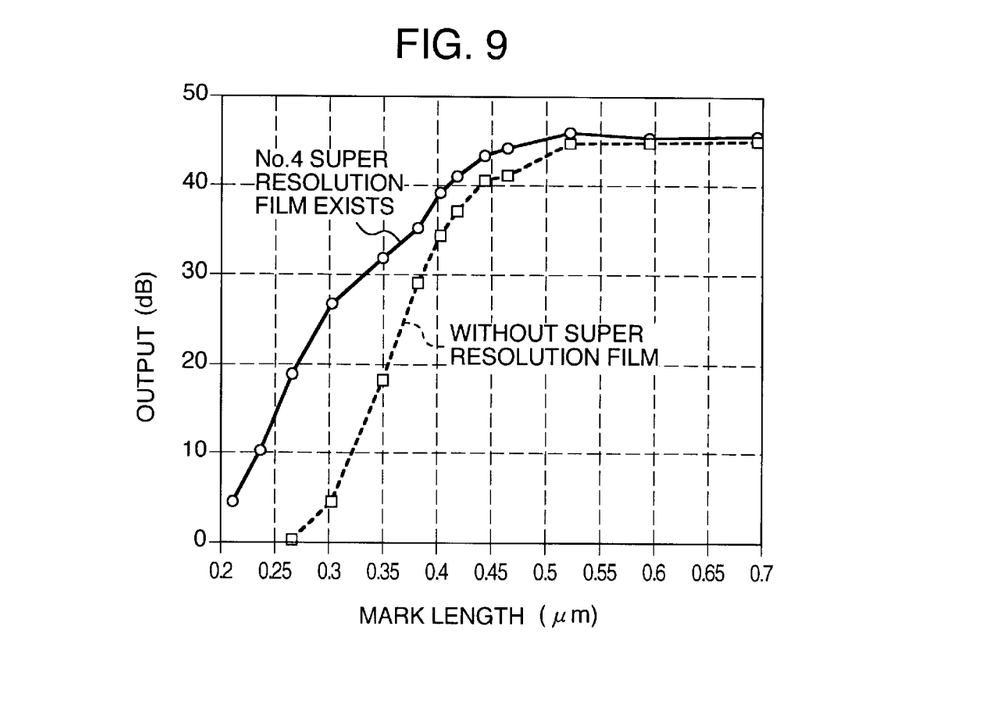
FIG. 9 is a diagram showing a change in output for a recording mark length which is obtained from the RAM disk of FIG. 8.

FIG. 9 shows a reproduction output intensity of the RAM disk on which recording marks having the same shape have been formed at regular intervals for a mark length of the recording marks. A reading laser power is set to 2 mW. It has been found that the reproduction output in the case where the super resolution film having the same compositions as those in the film of No. 4 has been formed is higher than that of the comparison example in which no super resolution film is formed (without super resolution film in FIG. 9) with respect to a short mark length. It has, therefore, been found that in the case where the super resolution film has been formed, the output can be reproduced with respect to the shorter mark length. From this result, the super resolution effect can be confirmed also for the RAM disk.

By examining all of the super resolution films in Table 1, results similar to those in case of the ROM disk are obtained.

Figure 10:
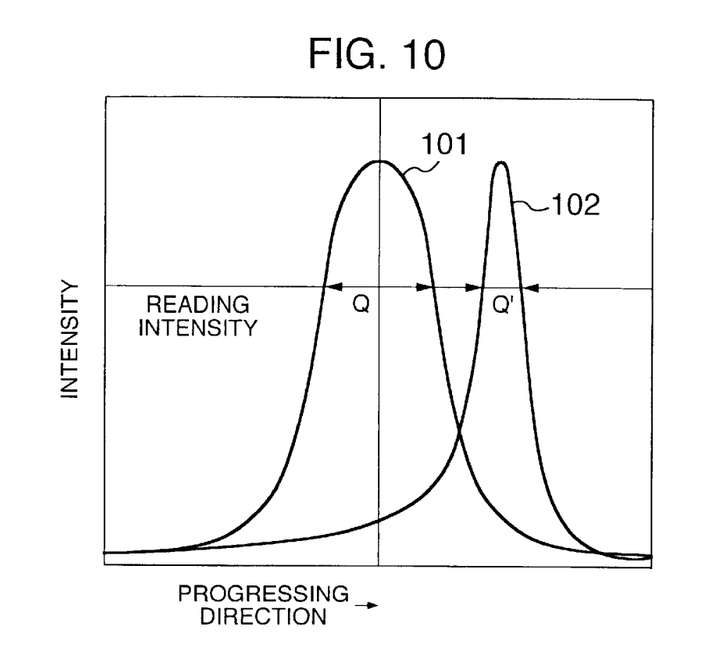
FIG. 10 is a diagram showing a change in laser beam diameter in the case where a glass film is formed and in the case where it is not formed.

Subsequently, a space intensity distribution of the reflection light when the above super resolution effect has been obtained is examined. FIG. 10 shows a diagram of intensity distributions of the laser beam for the progressing direction of the beam in the case where the film has been formed and the super resolution effect has been obtained and the case where no super resolution film is formed. The intensity distribution upon entering shows a Gaussian distribution. It has been found that, when no super resolution film is formed, a space distribution intensity 101 of the reflection light almost shows the Gaussian distribution, and that when the super resolution film is formed, a space distribution intensity 102 of the reflection light shows a state where the distribution of the beam is deviated in the progressing direction. At the same time, it has been found that a beam diameter Q' at a beam intensity necessary to read out is smaller than a beam diameter Q necessary to read out in the case where no super resolution film is formed.

As mentioned above, by forming the super resolution film according to the embodiment, the intensity or intensity distribution of the reading light can be changed. The super resolution effect can be obtained in such a case.

Subsequently, wavelength dependence of the super resolution effect is examined. The wavelength dependence is examined by a method whereby an RAM disk similar to that of FIG. 8 is formed, an output for the mark length similar to that in FIG. 9 is obtained with respect to each wavelength, and the minimum value (1 m) of the mark length at which the output is equal to or larger than 30 dB is examined. Lasers of 410 nm (blue), 520 nm (green), and 650 nm (red) are used as laser beams.

Results are shown in Table 2. In case of any of films, it has been found that the minimum value 1 m of the mark length at which the read output is equal to or larger than 30 dB decreases as the wavelength is shorter. This is because, in case of using the same optical lens, the shorter the wavelength is, the smaller the converged spot diameter is, and even a small mark can be reproduced.

TABLE 2

| | 1m ($\mu$m) | | |
|---|---|---|---|
| No. | 410 nm | 520 nm | 650 nm |
| 4 | 0.19 | 0.24 | 0.30 |
| 5 | 0.19 | 0.24 | 0.30 |
| 6 | 0.17 | 0.22 | 0.28 |
| 7 | 0.17 | 0.22 | 0.28 |
| 10 | 0.19 | 0.24 | 0.30 |
| 11 | 0.19 | 0.24 | 0.30 |
| 12 | 0.17 | 0.22 | 0.28 |
| 15 | 0.19 | 0.24 | 0.30 |
| 16 | 0.19 | 0.24 | 0.30 |
| 17 | 0.19 | 0.24 | 0.30 |
| 19 | 0.19 | 0.24 | 0.30 |
| 20 | 0.19 | 0.24 | 0.30 |
| 21 | 0.19 | 0.24 | 0.30 |
| 22 | 0.21 | 0.26 | 0.32 |
| 23 | 0.19 | 0.24 | 0.30 |
| 24 | 0.17 | 0.22 | 0.28 |
| 25 | 0.17 | 0.22 | 0.28 |
| 26 | 0.21 | 0.26 | 0.32 |
| 27 | 0.19 | 0.24 | 0.30 |
| 28 | 0.19 | 0.24 | 0.30 |
| 29 | 0.19 | 0.24 | 0.30 |
| 30 | 0.25 | 0.32 | 0.40 |

With respect to the RAM disk on which the film by which the super resolution effect was obtained in Table 1 has been formed, it has been found that the minimum value 1 ($\mu$m) of the mark length is small at any of the wavelengths. It has, consequently, been found that by forming the film, the readable mark length can be reduced multiplicatively by both the realization of the short laser wavelength and the super resolution effect.

Embodiment 4

Deterioration of the film for the repetitive reproduction is subsequently examined. Evaluation is performed by repetitively irradiating the reproduction signal light to the formed RAM disk and detecting its reproduction output. A mark length of the recording marks is set to 0.3 μm. A film having the same compositions as those in the film of No. 4 in Table 1 is used as a super resolution film. Further, a phthalocyanine system organic film is selected as a comparison example and is similarly examined.

Figure 11:
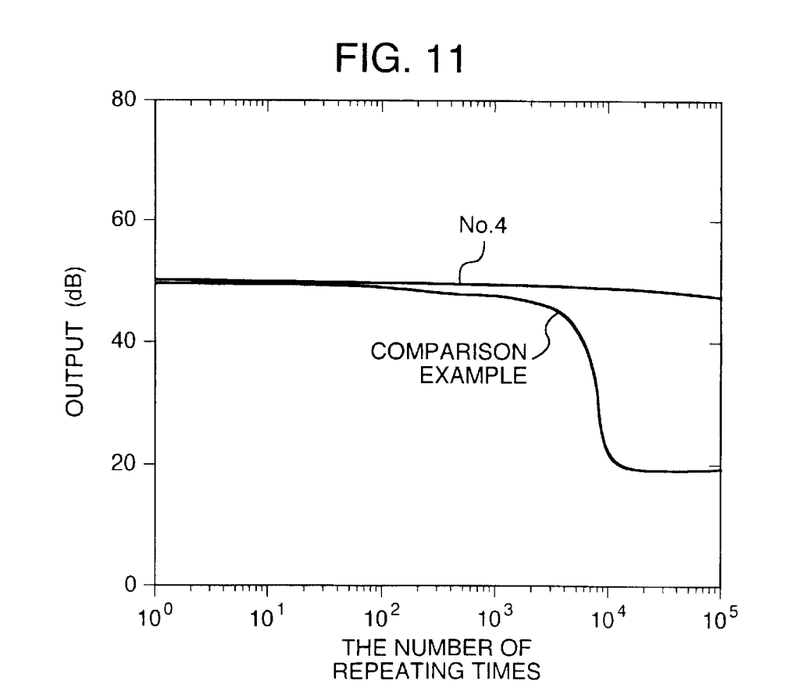
FIG. 11 is a diagram showing a relation between the number of times of the recording/reproducing operation and an output of the RAM disk on which a super resolution film in the embodiment of the invention has been formed.

FIG. 11 shows an output for the number of repeating times. In case of the disk on which the phthalocyanine system organic film has been formed, it has been found that the output gradually decreases from a point corresponding to the number of repeating times that is slightly smaller than 10,000 times. In case of the disk on which a glass film constructed by inorganic compounds having the same compositions as those in the film of No. 4 in Table 1 according to the embodiment has been formed, the output hardly decreases even by the repetitive reproduction of 100,000 times. As mentioned above, according to the optical disk of the embodiment, it has been found that the super resolution effect is held even after completion of the repetitive reproduction.

A high stability can be obtained for the repetitive reproduction even in the case where the films by which the super resolution effect has been derived in the embodiment 2 (in Table 1, Nos. 5 to 7, Nos. 10 to 12, Nos. 15 to 17, Nos. 19 to 29) among the other glass films in Table 1 are used as glass films.

As shown above, according to the embodiment, a read only optical disk (ROM disk) of a large capacity in which, further, a degree of deterioration is small for the repetitive reading operation is obtained. A large capacity rewritable optical disk (RAM disk) in which a deterioration is small for the repetitive reading and writing operations is obtained. Further, according to the embodiment, since an oxide such as transition metal or the like is contained in the glass board, a large capacity read only optical disk (ROM disk) can be obtained by the manufacturing based on the ordinary optical disk manufacturing steps. According to the embodiment, a large capacity rewritable optical disk (RAM disk) can be obtained by the manufacturing based on the ordinary optical disk manufacturing steps.

According to the invention, an optical recording medium having the super resolution film in which an output deterioration is small even if the reproduction is repetitively performed or the recording and reproduction are repetitively performed can be obtained.

According to the invention, an optical recording medium having the super resolution film in which good productivity is obtained and which has the super resolution effect can be obtained.

INDUSTRIAL APPLICABILITY

The optical information recording medium according to the invention is generally called an optical disk and, particularly, a super resolution film which can be used as an optical disk on/from which information can be recorded/reproduced and can record/reproduce information at a high density and has the high super resolution effect can be provided.

What is claimed is:

1. An optical information recording medium comprising, at least: a board on which pits having information have been formed; and a film which is formed directly on said board or formed thereon through another layer and changes a reflectance or an intensity distribution of reflection light in dependence on an intensity of incident light, wherein said film is inorganic compounds constructed by N (N is an integer of 2 or more) kinds of phases, the phases in a range from at least one kind to (N-1) kinds among said N kinds of phases are continuous phases, and the other phases are discontinuous phases.

2. An optical information recording medium comprising, at least: a board; a film which is formed directly on said board or formed thereon through another layer and changes a reflectance or an intensity distribution of reflection light in dependence on an intensity of incident light; and a recording film which is formed directly on said film or formed thereon through another layer and on which information is recorded by the light, wherein said film is inorganic compounds constructed by N (N is an integer of 2 or more) kinds of phases, the phases in a range from at least one kind to (N-1) kinds among said N kinds of phases are continuous phases, and the other phases are discontinuous phases.

3. A medium according to claim 1 or 2, wherein a mean diameter of said discontinuous phases lies within a range from 1 nm or larger to 70 nm or less and a width of continuous phases existing between said discontinuous phases lies within a range from 0.3 nm or larger to 100 nm or less.

4. A medium according to any one of claims 1 and 2, wherein said continuous phases are amorphous inorganic compounds and said discontinuous phases are crystal inorganic compounds.

5. A medium according to any one of claims 1 and 2, wherein said continuous phases are a dielectric substance and said discontinuous phases are any of a metal, a semiconductor, and a dielectric substance.

6. An optical information recording/reproducing apparatus comprising, at least: lasers of a plurality of wavelengths; means for selecting one of said lasers; and a focus adjusting unit for adjusting a focal point which changes every laser, wherein said apparatus further has means for discriminating a recording capacity of an optical information recording medium to record or reproduce according to any one of claims 1 and 2 and means for changing a tracking in accordance with the medium discriminated by said discriminating means.

7. An optical information recording/reproducing apparatus according to claim 6, wherein a mean diameter of said discontinuous phases lies within a range from 1 nm or larger to 70 nm or less and a width of continuous phases existing between said discontinuous phases lies within a range from 0.3 nm or larger to 100 nm or less.

8. An optical information recording/reproducing apparatus according to claim 6, wherein said continuous phases are amorphous inorganic compounds and said discontinuous phases are crystal inorganic compounds.

9. An optical information recording/reproducing apparatus according to claim 6, wherein said continuous phases are a dielectric substance and said discontinuous phases are any of a metal, a semiconductor, and a dielectric substance.

10. An optical information recording medium comprising, at least: a board on which pits having information have been formed; and a film which is formed directly on said board or formed thereon through another layer and changes a reflectance or an intensity distribution of reflection light in dependence on an intensity of incident light, wherein said film is constructed by N (N is an integer of 2 or more) kinds of phases containing at least one or more kinds of elements selected from Co, Ti, V, Cr, Mn, Fe, Ni, Si, Pb, Bi, and Al, the phases in a range from at least one kind to (N−1) kinds among said phases are continuous phases, and the other phases are discontinuous phases.

11. An optical information recording medium comprising, at least: a board; a film which is formed directly on said board or formed thereon through another layer and changes a reflectance or an intensity distribution of reflection light in dependence on an intensity of incident light; and a recording film which is formed directly on said film or formed thereon through another layer and on which information is recorded by the light, wherein said film is constructed by N (N is an integer of 2 or more) kinds of phases containing at least one or more kinds of elements selected from Co, Ti, V, Cr, Mn, Fe, Ni, Si, Pb, Bi, and Al, the phases in a range from at least one kind to (N−1) kinds among said N kinds of phases are continuous phases, and the other phases are discontinuous phases.

12. An optical information recording medium comprising, at least: a board; a film which is formed directly on said board or formed thereon through another layer and changes a reflectance or an intensity distribution of reflection light in dependence on an intensity of incident light; and a recording film which is formed directly on said film or formed thereon through another layer and on which information is recorded by the light, wherein a refractive index of said film changes due to said incident light when the incident light enters, and assuming that a refractive index at the time when no incident light enters is labelled to $n_0$ and an intensity of the incident light is set to I, if an absolute value n of the refractive index that is measured is indicated by $n=n_0+n_2 I$ a value of $n_2$ lies within a range from $1.0\times10^{-9}$ $(m^2/W)$ or larger to $1.0\times10^{-7}$ $*m^2/W$) or less.

13. A medium according to claim 12, wherein the absolute value n of said refractive index changes in a time within a range from $2.50\times10^{-7}$ second or longer to $3.50\times10^{-7}$ second or shorter after an irradiation of the incident light and is recovered to an original refractive index in a time interval within a range from $2.5\times10^{-7}$ second or longer to $1.0\times10^{-2}$ second or shorter after a removal of the incident light.

14. A medium according to any one of claims 10 to 13, wherein said film is an oxide which contains a Co oxide and in which a remaining part is constructed by elements of at least one or more kinds among Si, Ti, Al, Pb, and Bi.

15. An optical information recording/reproducing apparatus comprising, at least: lasers of a plurality of wavelengths; means for selecting one of said lasers; and a focus adjusting unit for adjusting a focal point which changes every laser, wherein said apparatus further has means for discriminating a recording capacity of an optical information recording medium to record or reproduce according to any one of claims 10–13 and means for changing a tracking in accordance with the medium discriminated by said discriminating means.

16. An optical information recording/reproducing apparatus according to claim 15, wherein said film is an oxide which contains a Co oxide and in which a remaining part is constructed by elements of at least one or more kinds among Si, Ti, Al, Pb, and Bi.

* * * * *